(12) United States Patent
Perez-Sanchez

(10) Patent No.: US 7,530,533 B2
(45) Date of Patent: May 12, 2009

(54) WING, PARTICULARLY AIRFOIL OF AN AIRCRAFT, HAVING CHANGEABLE PROFILE

(75) Inventor: Juan-Mauricio Perez-Sanchez, Feldkirchen-Westerham (DE)

(73) Assignee: Airbus Deutschland GmbH, Hamburg (DE)

( * ) Notice: Subject to any disclaimer, the term of this patent is extended or adjusted under 35 U.S.C. 154(b) by 318 days.

(21) Appl. No.: 11/231,917

(22) Filed: Sep. 21, 2005

(65) Prior Publication Data

US 2006/0237596 A1 Oct. 26, 2006
US 2007/0152106 A9 Jul. 5, 2007

Related U.S. Application Data

(60) Provisional application No. 60/631,341, filed on Nov. 29, 2004.

(30) Foreign Application Priority Data

Sep. 21, 2004 (DE) ........................ 10 2004 045 651

(51) Int. Cl.
*B64C 3/44* (2006.01)
(52) U.S. Cl. ...................................... 244/219
(58) Field of Classification Search ................ 244/219, 244/218, 211–215, 217
See application file for complete search history.

(56) References Cited

U.S. PATENT DOCUMENTS 2,152,029 A * 3/1939 Cone .......................... 244/215

(Continued)

FOREIGN PATENT DOCUMENTS

DE 19936721 A1 2/2001

(Continued)

OTHER PUBLICATIONS

"Smart wings eliminate mechanical linkages" Design Engineering, Jul./Aug. 1995, pp. 43-44, XP 000517526.

*Primary Examiner*—Tien Dinh
(74) *Attorney, Agent, or Firm*—Christopher Paradies; Fowler White Boggs Banker P.A.

(57) ABSTRACT

A wing, particularly an airfoil of an aircraft, having a changeable profile, which extends in the wing depth direction (5) running essentially in the flow direction and transversely thereto in the wing span direction and has a first planking (55a) and a second planking (55b), and having a flexible area (11), through which the profile of the wing (1) is adjustable, is described. The flexible area (11) may comprise one or more than one vortex elements (154") extending in a longitudinal direction, which are connected to one another in an articulated way on their longitudinal sides in a predefined dimension via joint areas (169") and between which the first planking (55a) and the second planking (55b) are provided, the vortex elements (154") having a transmission area (164"), which runs transversely to their longitudinal direction and is connected to the first planking (55a), and a drive or adjustment area (163"), which is at a distance in the vertical direction and is coupled to an adjustment mechanism (505") for moving the vortex elements (154") around the joint areas (169"), the adjustment mechanism (505") containing one or more lever elements (507"), which are coupled between the drive or adjustment area (163") of the lever elements (154") and the second planking (55b) and are rotatable or pivotable by one or more drive elements (509") so as to mutually displace drive or adjustment area (163") and second planking (55b) to change the wing profile in response to a corresponding externally supplied control signal.

30 Claims, 17 Drawing Sheets

U.S. PATENT DOCUMENTS

| | | | | |
|---|---|---|---|---|
| 4,113,210 A | * | 9/1978 | Pierce | 244/219 |
| 4,247,066 A | * | 1/1981 | Frost et al. | 244/219 |
| 4,296,900 A | | 10/1981 | Krall | |
| 4,312,486 A | * | 1/1982 | McKinney | 244/215 |
| 4,361,299 A | * | 11/1982 | Sharrock | 244/216 |
| 6,375,127 B1 | * | 4/2002 | Appa | 244/215 |
| 6,644,599 B2 | * | 11/2003 | Perez | 244/219 |

FOREIGN PATENT DOCUMENTS

| | | |
|---|---|---|
| DE | 10325950 A1 | 1/2005 |
| EP | 1205383 A2 | 11/2001 |
| WO | 97/44238 A1 | 11/1997 |

* cited by examiner

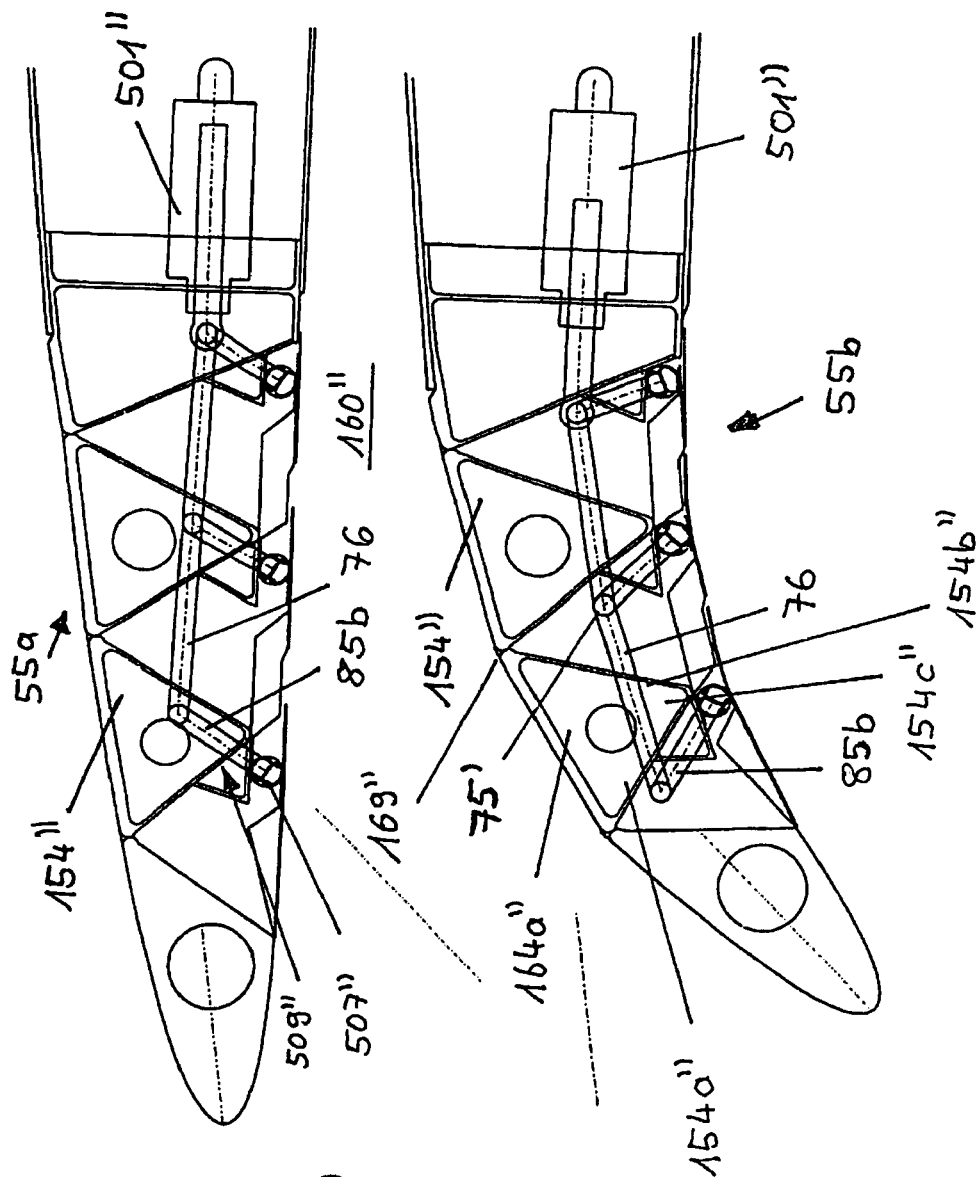

WING, PARTICULARLY AIRFOIL OF AN AIRCRAFT, HAVING CHANGEABLE PROFILE

RELATED APPLICATIONS

This application claims the benefit of the filing date of U.S. Provisional Patent Application No. 60/631,341 filed Nov. 29, 2004, and of German Patent Application No. 10 2004 045 651.8 filed Sep. 21, 2004, the disclosures of which are hereby incorporated herein by reference.

FIELD OF THE INVENTION

The field relates to aircraft wing lift and control surfaces.

BACKGROUND

Control flaps are used for changing the shape of a wing, which affects the lift and direction of an aircraft. Conventional control flaps are manufactured using rigid parts. Fluid flow over the surfaces of the wing and the flaps is less than optimal aerodynamically over the full range of motion of these rigid control flaps. The load distribution over such rigid control flaps is not favorable, because large local stresses are located at the points of connection between the wing and the control flaps.

Depending on context the term flexible may mean adaptable, variable, capable of change or pliable. Flexible is used in its broadest reasonable definition within context.

SUMMARY OF THE INVENTION

The shape of a control flap of the present invention is locally adjustable, providing a changeable profile. The wing is extendable in the wing depth direction along the direction of fluid flow. The wing is also extendable in the direction of the wingspan.

In one embodiment, a wing has a flexible area comprising at least one vortex element having a transmission area and an adjustment area. The transmission area extends transversely to the longitudinal direction of the vortex element. The adjustment area is at a distance in the vertical direction from the transmission area, allowing the wing to extend in the wing depth direction along the direction of fluid flow and the transverse direction along the wingspan, adjusting the wing profile. The vortex element may be articulatedly connected to the wing on longitudinal sides of the vortex element, allowing an adjustment mechanism to move the vortex element around. The flexible area is adapted to adjust the profile of the wing. Joint areas couple the adjustment mechanism to the adjustment area. At least one lever element is coupled between the adjustment area of the vortex element and planking, and the at least one lever element is capable of being rotated or pivoted by a drive element such that the adjustment area and planking change the wing profile in response to a corresponding externally supplied control signal.

There are many advantages of the wing of the present invention. Among these advantages are the ability to better optimize fluid flow over the wing and control flap surfaces and the ability to reduce stress concentrations at fixed attachment points between control surfaces and the fixed portion of the wing.

BRIEF DESCRIPTION OF THE DRAWINGS

The following drawings illustrate examples of a wing according to present invention.

FIGS. 17a) and b) show a flexible wing area in the extended and in the curved position, respectively.

DETAILED DESCRIPTION OF PREFERRED EMBODIMENTS

Figure 1:
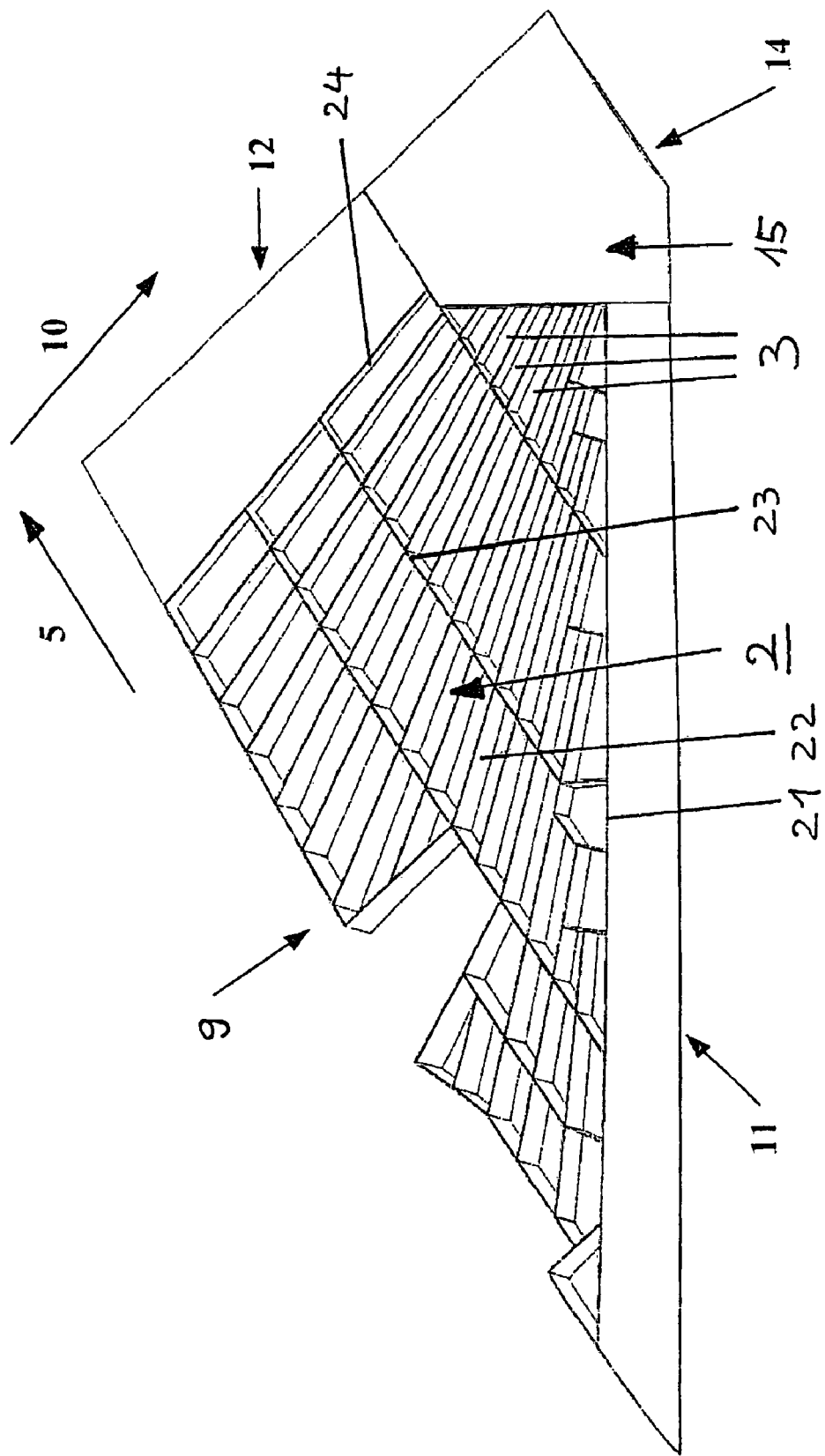
FIG. 1 shows an isometric view of a wing, which wing has a flexible wing region on its front edge and on its rear edge, as well as on its outer end.
Figure 2:
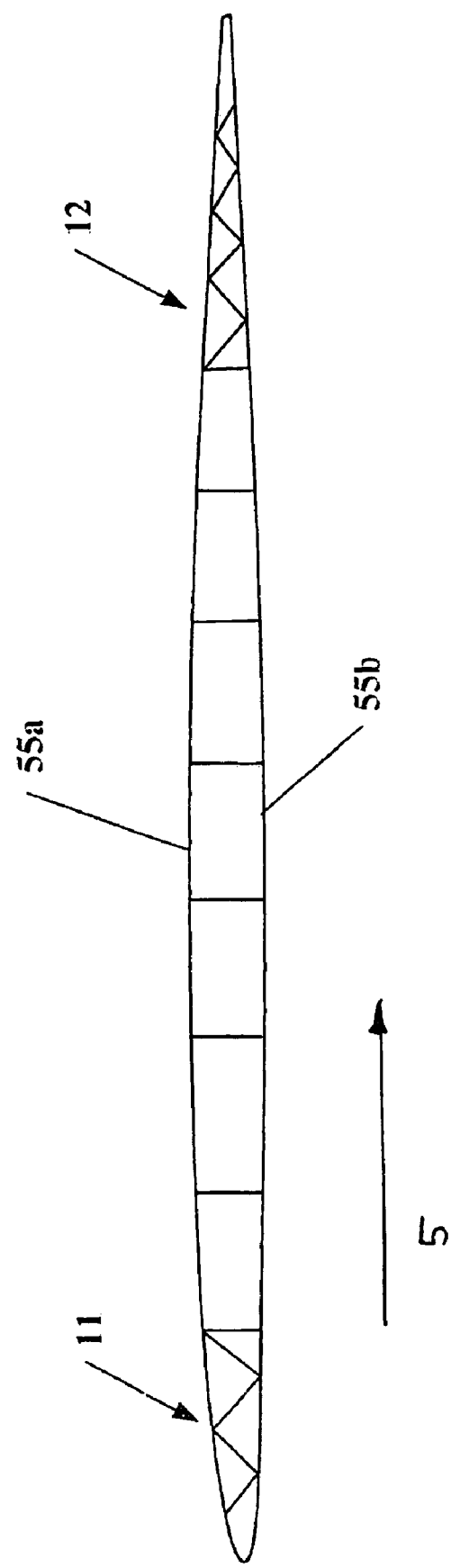
FIG. 2 shows a section in the flow or wing depth direction through the wing shown in FIG. 1.
Figure 3:
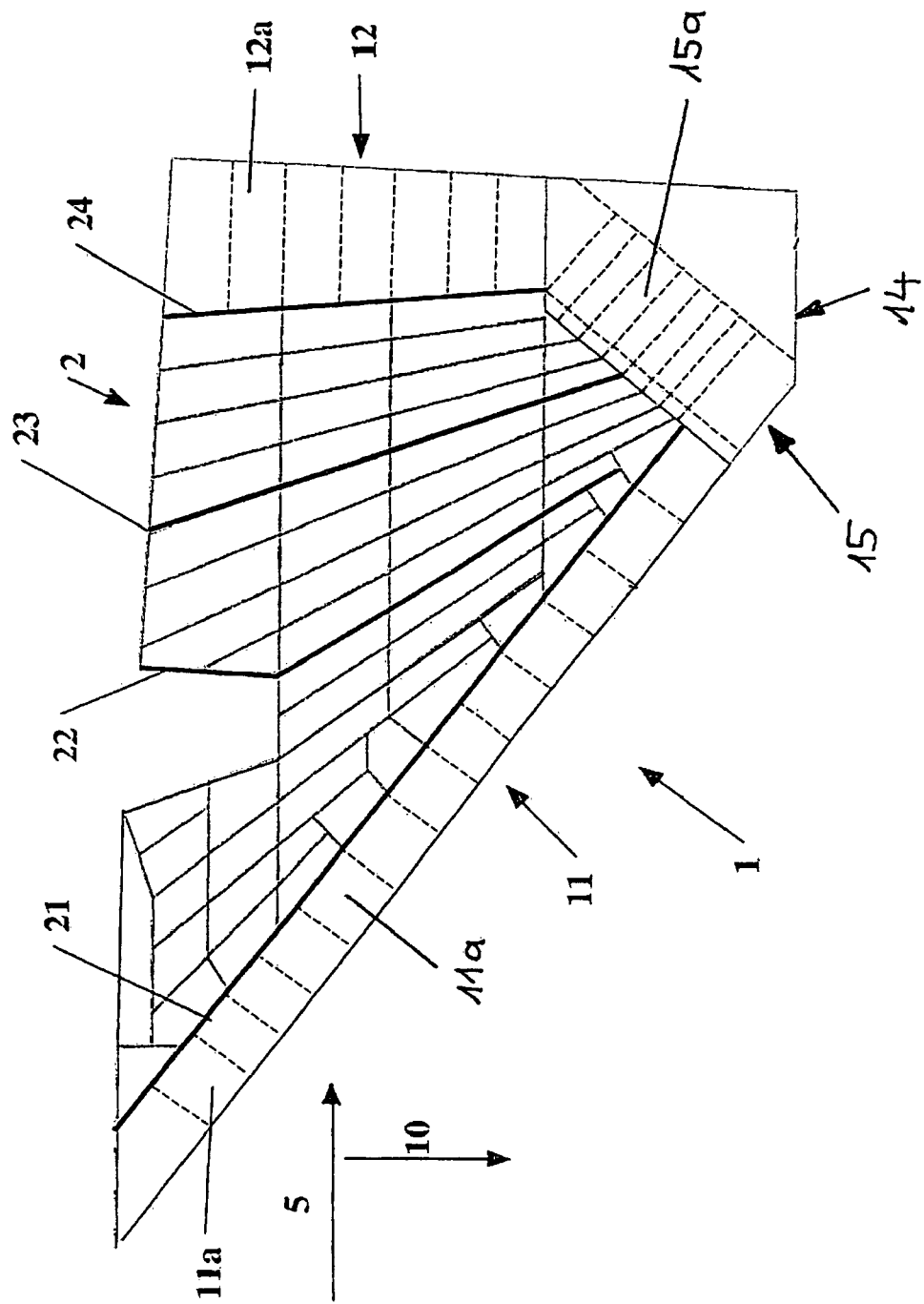
FIG. 3 shows a top view of the wing of the exemplary embodiment illustrated in FIGS. 1 and 2.

An airfoil of an aircraft in the form of a delta wing, which has multiple shape-variable or flexible wing areas according to one embodiment of the wing, is illustrated in FIGS. 1 through 3. However, the wing 1 may be any wing of any shape used for lift and control through a fluid medium. The control surfaces may be used for influencing fluid flow.

In the airfoil of an aircraft illustrated in FIGS. 1 through 3, shape-variable wing areas 11, 12, 15 are provided, which may be provided for controlling the aircraft, but also for other purposes, for example, to influence the structure load.

The airfoil or wing 1 of an aircraft is illustrated in FIG. 1. The airfoil 1 comprises a supporting area 2, formed by at least one wing box 3, which extends from a root area 9 to a wing tip area 14. The wing box may have multiple spars 21, 22, 23, 24, some of which are particularly emphasized in FIGS. 1 and 2. The wing 1 comprises three different shape-variable wing areas 11, 12, 15. Alternatively, the wing 1 may be formed as a whole by one shape-variable wing area.

As shown in FIG. 2, the wing 1 is provided with a first planking 55a and a second planking 55b. The depth arrow 5 illustrates the direction of the wing depth, which is approximately the direction of fluid flow over the wing or approximate flow direction in relation to the wing 1, while the span arrow 10 illustrates the wing span direction.

The wing 1 may have a one-piece front edge area 11 or, alternatively, a front edge area 11 divided into multiple segments 11a, such as illustrated in FIG. 3. The wing 1 may have a one-piece rear edge area 12 or, alternatively, a rear edge area 12 divided into multiple segments 12a. Furthermore, the wing 1 has a wing tip or wing end area 15, which may be one-piece or may be formed by multiple segments 15a, as shown again in FIG. 3. The front edge area 11, the rear edge area 12, and the wing tip or wing end area 15 are each examples of the present invention either taken along or in combination with the supporting area 2 of the wing. The wing may also be designed differently than the wing illustrated in FIGS. 1-3. For example, the adjustable area of the wing 1 does not have extend over the entire wing span width 10, as shown in FIGS. 1-3, but rather may extend over only a partial zone of the airfoil 1.

In FIGS. 1 through 3, the front edge area 11, the rear edge area 12, and the wing tip or wing end area 15 form flexible or variable areas of the airfoil 1.

Figure 4:
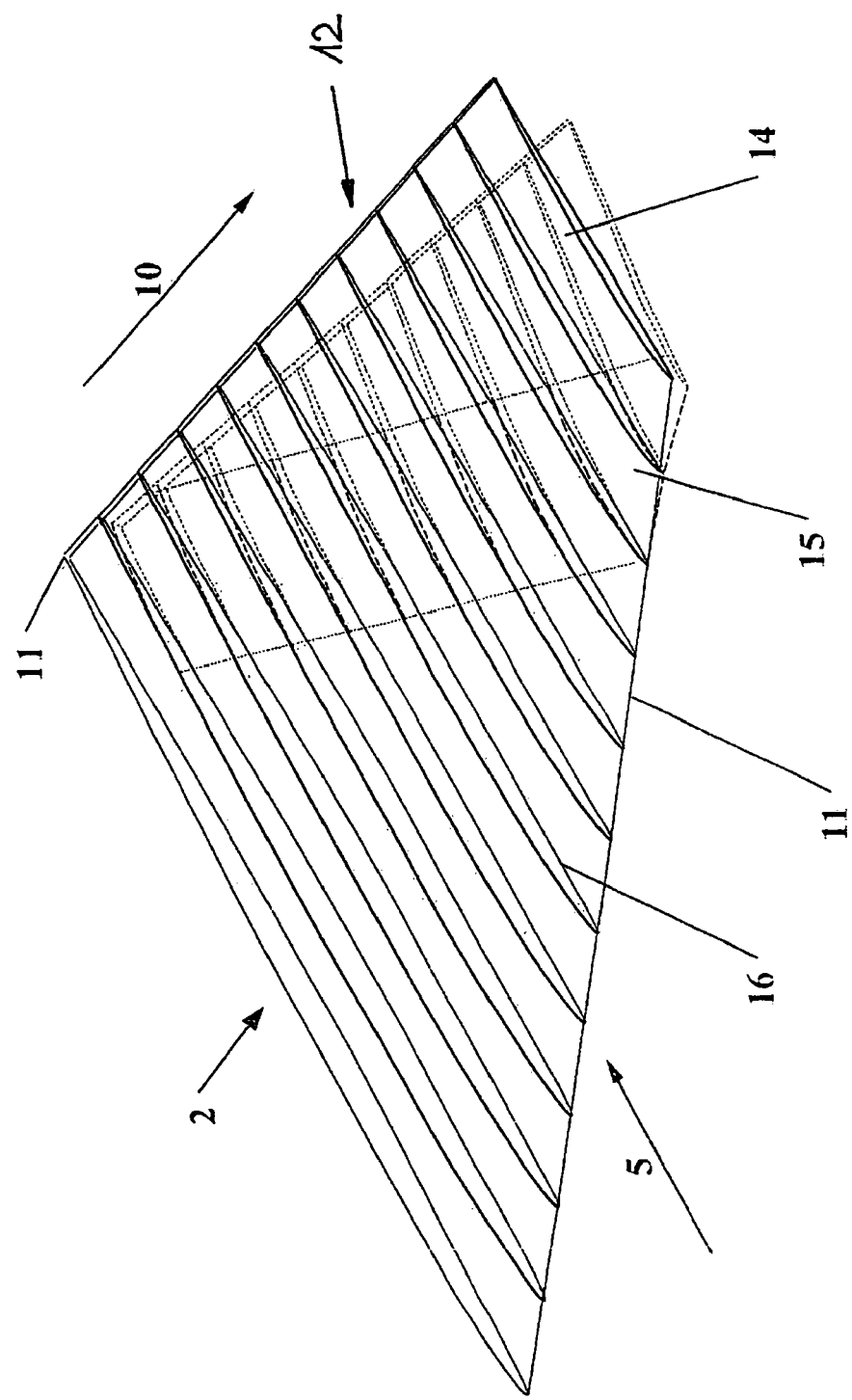
FIG. 4 shows a perspective illustration of two different adjustment states of an airfoil having profile cables additionally shown.

FIG. 4 shows, for example, an airfoil 1, in which a flexible area 15 extends diagonally and obliquely over the supporting area 2, from which the two adjustment states, illustrated using solid lines and/or using dashed lines, and all adjustment states of the wing tip area 14, 15 lying between them may be illustrated. The profile cables 16 additionally shown in FIG. 4 make the type of the change of the wing profile clear.

As is shown from FIGS. 1 and 3, the flexible area 15 which connects the wing tip area 14 to the supporting area 2 of the wing 1 is positioned near the wing end and runs obliquely to the wing depth direction 5 from the front edge area 11 to the rear edge area 12. A control or trimming function may be fulfilled by adjusting the profile of the flexible area 15 and the wing tip area 14. The wing load may also be changed or minimized in connection with a corresponding control or regulation unit.

FIGS. 5 and 6, 11 through 14, and 17 each show, on the basis of preferred exemplary embodiments, an adjustment mechanism, which is used to adjust the profile shape of a shape-variable wing area. The longitudinal direction X of the adjustment mechanism and/or of the shape-variable wing area lying in the plane of the drawing of the figures runs obliquely to the wing depth direction 5 or parallel thereto, depending on the sweep of the wing 1. The height or vertical direction Y of the adjustment mechanism runs perpendicularly to the longitudinal direction X, also in the plane of the drawing.

As the cross-sectional view of FIGS. 5 and 6, 11 through 14, and 17 shows, the shape-variable or flexible wing area, which may be the area 11, 12, or 15 shown in FIGS. 1 through 3, for example, comprises multiple vortex elements 154; 154'; 154", located between the first planking 55a and second planking 55b, which are positioned one behind another viewed in relation to the longitudinal direction X of the shape-variable wing area and are connected to one another in an articulated way in a predefined dimension by joints or joint areas 169, 200; 169'; 169". The vortex elements 154; 154'; 154" may be produced from box-shaped or similarly designed elements. They may be extended in a transverse direction Z, which runs perpendicularly to the longitudinal direction X and therefore perpendicularly to the plane of the drawing in the figures cited. The vortex elements 154; 154'; 154" illustrated in the figures cited have, in section, an essentially triangular basic shape, but they may also have a different basic shape, such as quadrilateral basic shape.

The vortex elements 154 shown in FIGS. 5 and 6 have a transmission area 164, placed near the first planking 55a, which extends parallel to and below the first planking 55a. Alternatively, the first planking 55a may itself be formed from the transmission areas 164'; 164" of the vortex elements 154'; 154" positioned one behind another, as is shown in the exemplary embodiment illustrated in FIGS. 11 through 14 and 17, which will be explained in greater detail later. For this purpose, the first planking 55a is assembled using the segments forming the transmission areas 164'; 164" as facets, which segments are implemented as planar in this case.

The first planking 55a may be the upper planking, as illustrated in the exemplary embodiments, but it may also be the lower planking. The vortex elements 154 may be formed, as in the case illustrated, from box-shaped elements or even from rod-shaped or rib-shaped elements or from other types of elements or also from plate-shaped elements.

Figure 5:
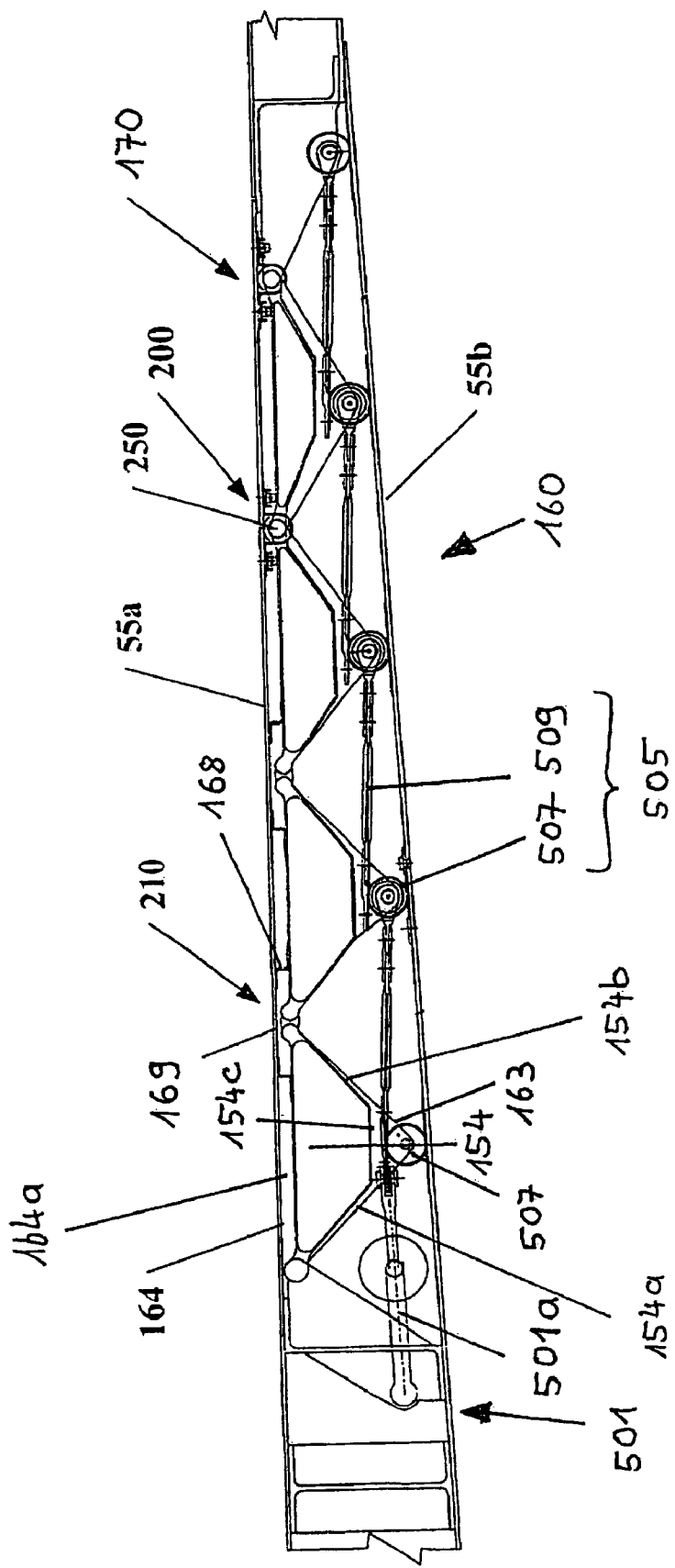
FIG. 5 shows a section in bending direction of a variable or flexible wing area according to an exemplary embodiment of the wing, wherein the flexible area being formed by multiple vortex elements, which are extended in a longitudinal direction and positioned between a first planking and a second planking of the wing.
Figure 6:
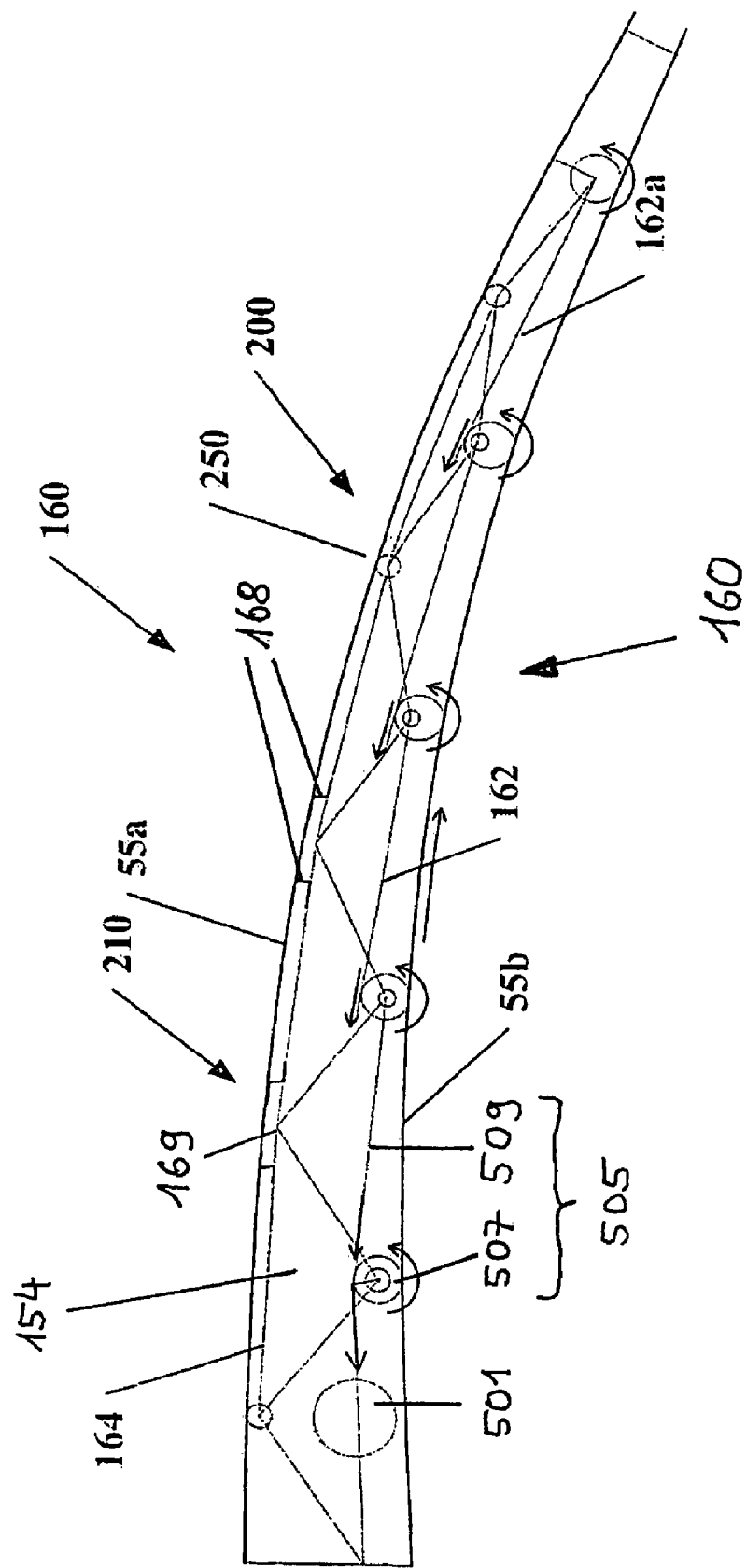
FIG. 6 shows a schematic illustration of the wing shown in FIG. 5 in a curved position, which is particularly used to explain an adjustment mechanism provided for changing the wing profile.

For the exemplary embodiments illustrated in FIGS. 5 and 6 and/or 11 through 14 and/or 17, a drive or adjustment area 163; 163'; 163" of the vortex elements 154; 154'; 154" is provided in the height or vertical direction Y at a distance from the transmission area 164; 164'; 164", on which an adjustment mechanism, provided overall with reference numbers 160; 160'; 160", engages for the purpose of changing the profile shape of the variable wing area. The adjustment mechanism 160; 160'; 160" comprises adjustment elements 505; 505'; 505" having one or more lever elements 507; 507'; 507", which are coupled between the drive or adjustment area 163; 163'; 163" of the vortex elements 154; 154'; 154" and the second planking 55b and which are rotatable or pivotable by one or more drive elements 509; 509'; 509" so as to mutually displace drive or adjustment area 163; 163'; 163" and second planking 55b in order to change the wing profile, which occurs in response to a corresponding externally supplied control signal. In this way, the vortex elements 154; 154'; 154", or at least a part thereof, are rotatable or pivotable.

In the embodiments of FIGS. 5 and 6 and/or of FIGS. 11 through 14 and/or of FIG. 17, the vortex elements 154; 154' have triangular basic shape, the drive or adjustment area 163; 163' being located between the first planking 55a and the second planking 55b and near the latter. Alternatively, the drive or adjustment area 163 may also be provided outside the area located between the first planking 55a and the second planking 55b.

In the embodiments of FIGS. 5 and 6 and/or 11 through 14 and/or 17, the vortex elements 154; 154'; 154" have a triangular basic shape, which is formed by a box-shaped element and has a base element 164a; 164a'; 164a", which forms a transmission area 164; 164'; 164" and runs parallel below the first planking 55a and/or partially forms it. A first leg 154a; 154a'; 154a" and a second leg 154b; 154b'; 154b" run from the base element 164a; 164a'; 164a" to a tip 164c; 164c'; 164c" of the vortex element 154; 154'; 154" diametrically opposite the base element 164a; 164a'; 164a". The tips 154c; 154c'; 154c" of the vortex elements 154; 154'; 154" form a drive or adjustment area 163; 163'; 163", to which the adjustment elements 505; 505'; 505" of the adjustment mechanism 160; 160'; 160" are coupled, which are used for the purpose of rotating or pivoting the vortex elements 154; 154'; 154" to change the wing profile in response to an externally supplied control signal. The adjoining sides of two neighboring vortex elements 154; 154'; 154" are connected to one another via a joint or a joint area 169; 169'.

In the exemplary embodiment of FIGS. 5 and 6, the adjoining sides of the vortex elements 154 are connected to the first planking 55a via a structure joint 250.

In the exemplary embodiment shown in FIGS. 5 and 6, the adjustment elements 505 forming the adjustment mechanism 160 each comprise a lever element 507 and a drive element 509. The lever elements 507 are formed by roller-shaped elements, one side of whose circumference presses against a part of the second planking 55b and which are coupled by a flexible band arrangement 583a, 583b to produce a rolling movement between the second planking 55b and the roller-shaped lever element 507. The roller-shaped lever elements 507 are coupled to the drive or adjustment area 163 at their axis of rotation 508. On the other side of their circumference, diametrically opposite the second planking 55b, the lever elements 507 are coupled to the drive element 509, which is formed by a rod-shaped or string-shaped element. A rotation or pivot of the lever element 507 by the rod-shaped drive elements 509 causes mutual displacement of connection area 163 and second planking 55b to change the wing profile, as shown in FIG. 6. The adjustment mechanism 160 comprises multiple adjustment elements 505 positioned one behind another in the longitudinal direction X, each of which is formed by such a lever element 507 and a rod-shaped drive element 509 connected thereto. These two elements may also be produced in other ways according to the related art.

In the exemplary embodiment illustrated in FIGS. 5 and 6, the rod-shaped drive elements 509 are coupled between the connection area 163, namely to the axis 508 of the lever element 507, and the second side of the lever element 507 of the preceding vortex element 154, i.e., the side facing away from the second planking 55b, in order to relay the drive movement between two sequential vortex elements 154. The drive element 509 of a first vortex element 154 in the drive direction is coupled to an actuator unit 501, which is provided in the exemplary embodiment illustrated to actuate the entire adjustment mechanism 160 and is connected to the second side, i.e., the side facing away from the second planking 55b, and therefore also to the following rod-shaped drive element 509.

The actuator unit 501 is an actuator which exerts a pushing and pulling movement that is transmitted from a final control element 501a of the actuator unit 501 to the first rod-shaped drive element 509 and therefore to all further drive elements 509 and therefore to all adjustment elements 505 of the adjustment mechanism 160. In this way, the drive movement of the final control element 501a of the thrust actuator 501 is transmitted over the entire changeable or flexible wing area, as shown in FIG. 6.

Alternatively, according to another embodiment, the drive elements 509 provided between two sequential vortex elements 154 may each be formed by an actuator unit whose own length is changeable, which is shortened or lengthened in response to an externally supplied control signal, so that an adjustment movement between two neighboring vortex elements 154 results in each case.

Figure 7:
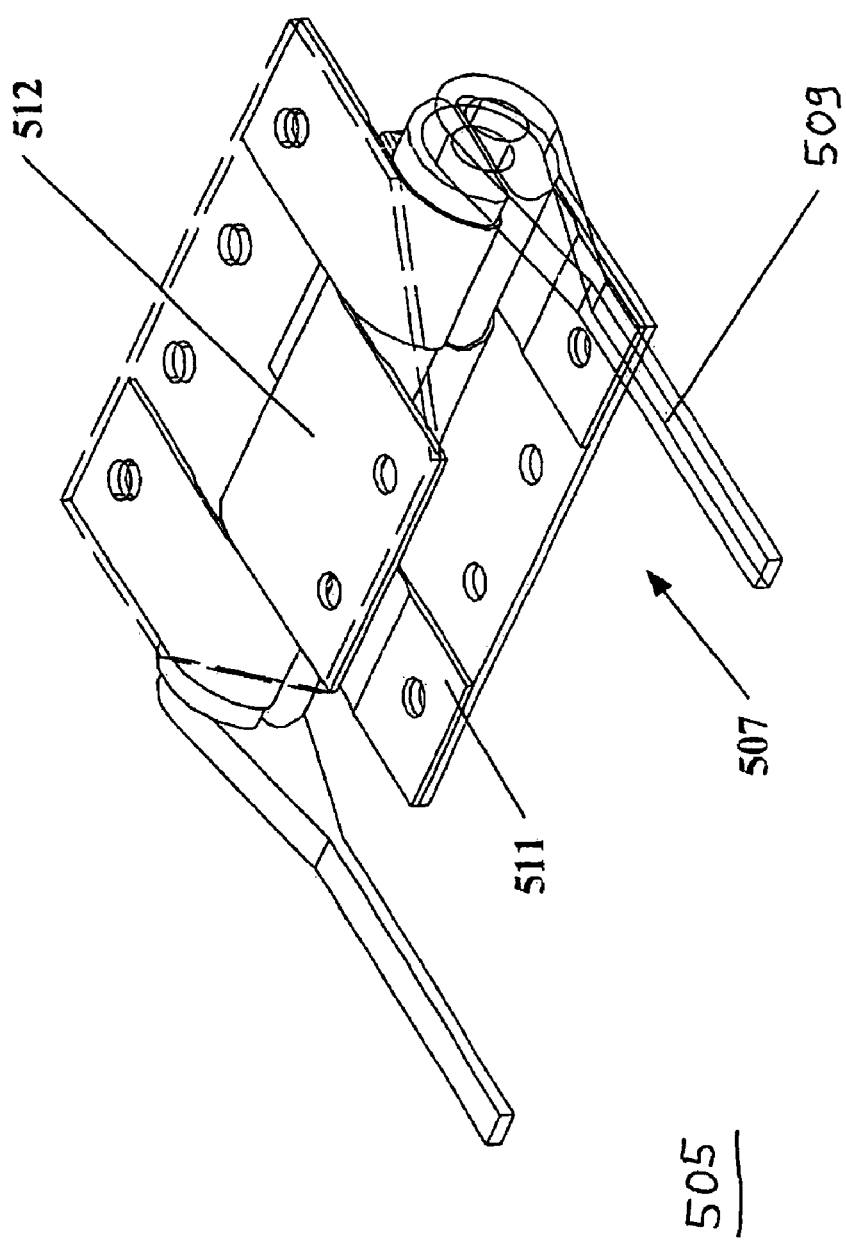
FIG. 7 shows an enlarged perspective view which shows a detail of the adjustment mechanism cited.

FIG. 7 shows an enlarged perspective illustration of an adjustment element 505 formed by a roller-shaped lever element 507 and a rod-shaped drive element 509, as is shown in FIG. 5 and FIG. 6, and which is fixed on one side on the second planking 55b and on the other side on the drive elements 509 by flexible band arrangements 511, 512.

Figure 8:
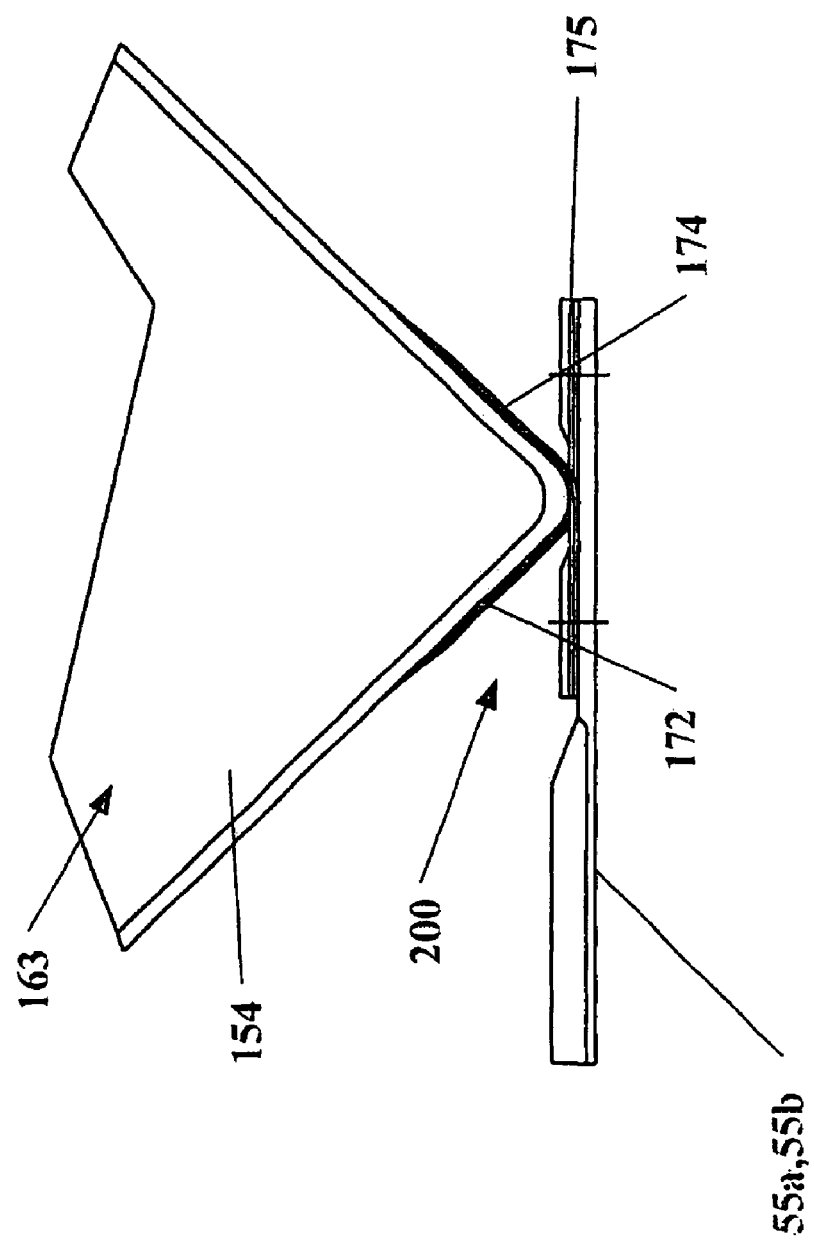
FIG. 8 shows an enlarged illustration which illustrates an embodiment of an articulated connection between vortex elements contained in the flexible wing area and a planking of the airfoil.

FIG. 8 shows a possibility of how the drive or adjustment area 163 of a vortex element 154 may be fixed to a first or second planking 55a, 55b via bands 172, 174 having bending elasticity, which together form a flexible joint 200.

Figure 9:
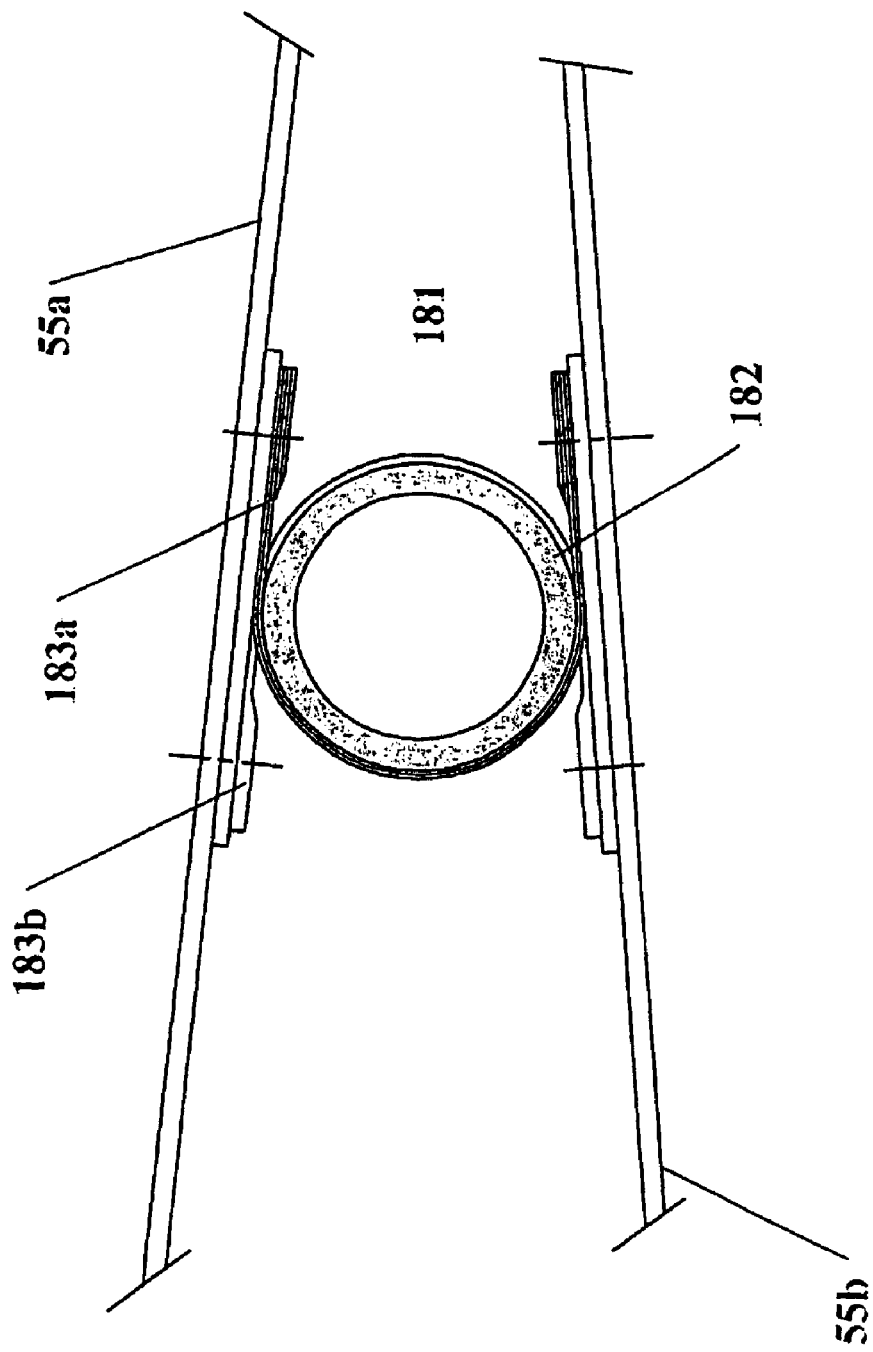
FIGS. 9 and 10 show lateral sectional views of spacers which hold the first planking and the second planking of a wing at a predefined distance and simultaneously allow relative displacement of the two in a predefined direction.
Figure 10:
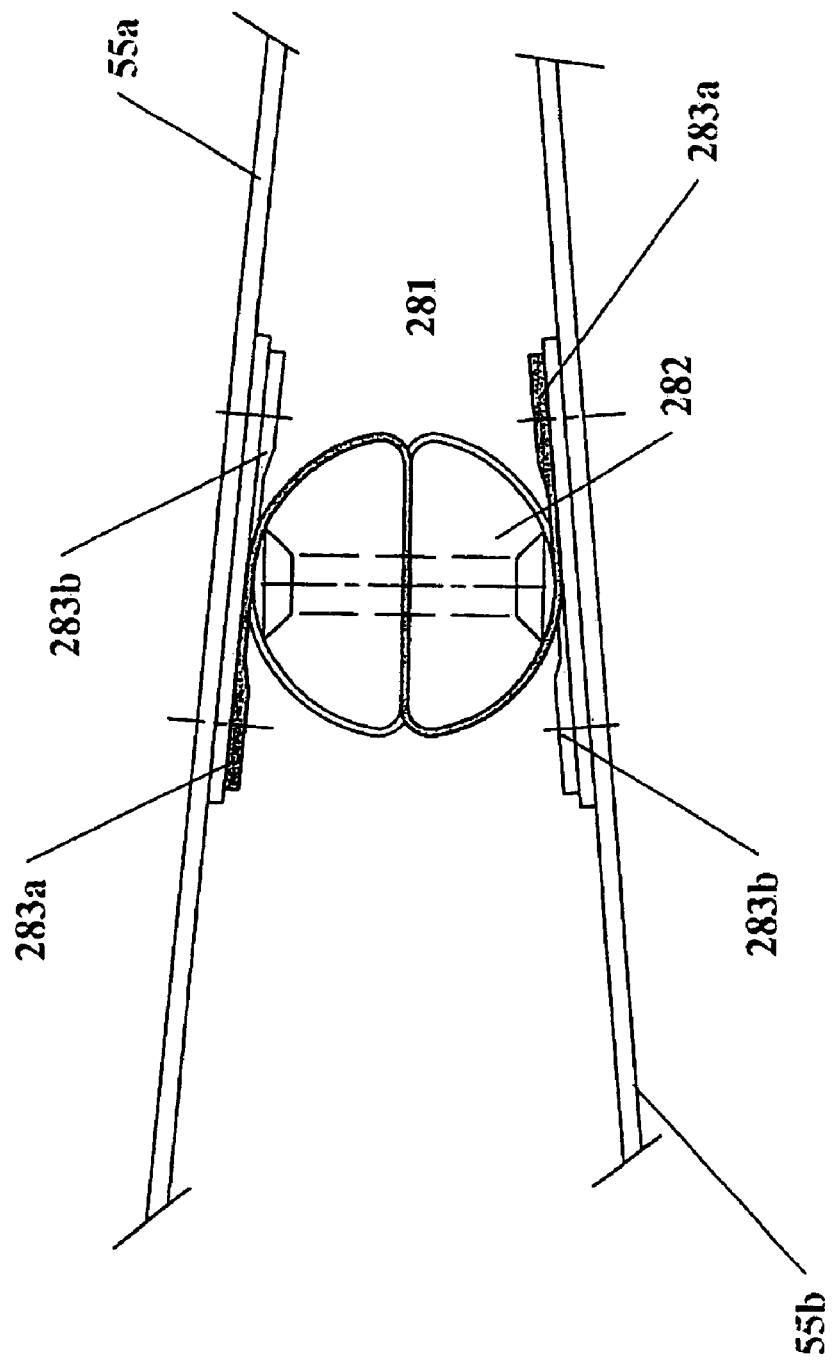
Figure 11:
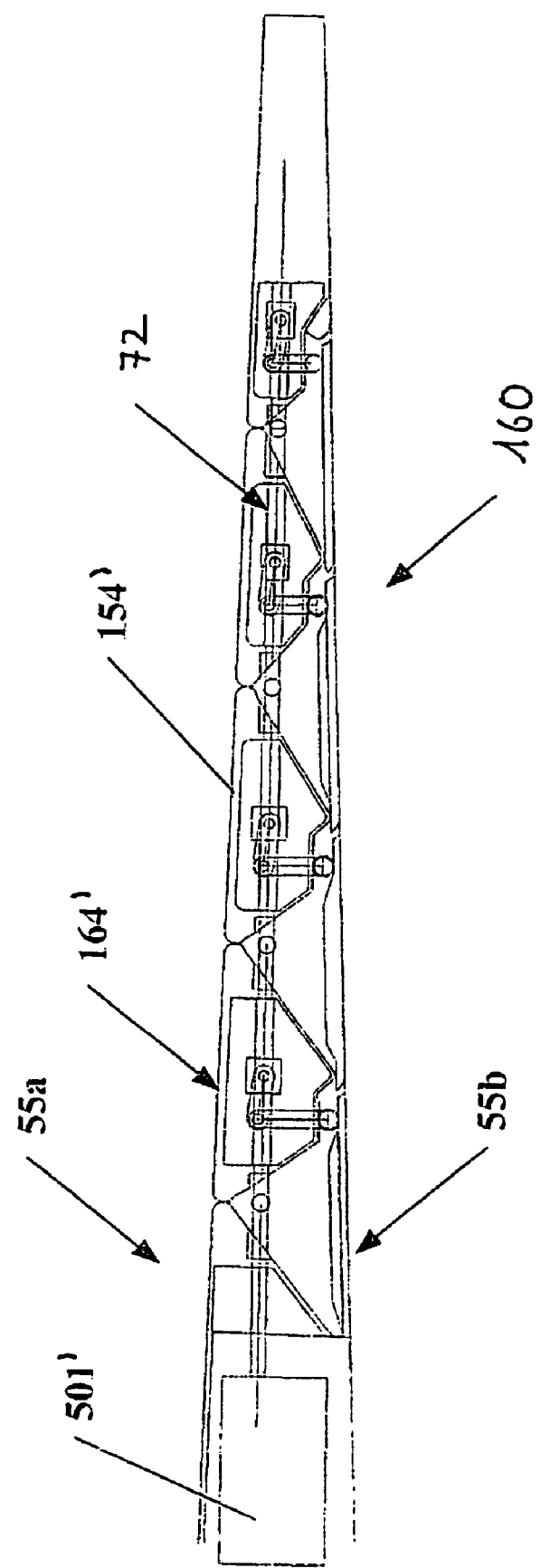
FIG. 11 shows a section in the bending direction through a changeable or flexible area of the wing according to another example of the present invention. The flexible area is formed by multiple vortex elements, which are extended in a longitudinal direction and positioned between a first planking and a second planking of the wing, in the extended position.
Figure 12:
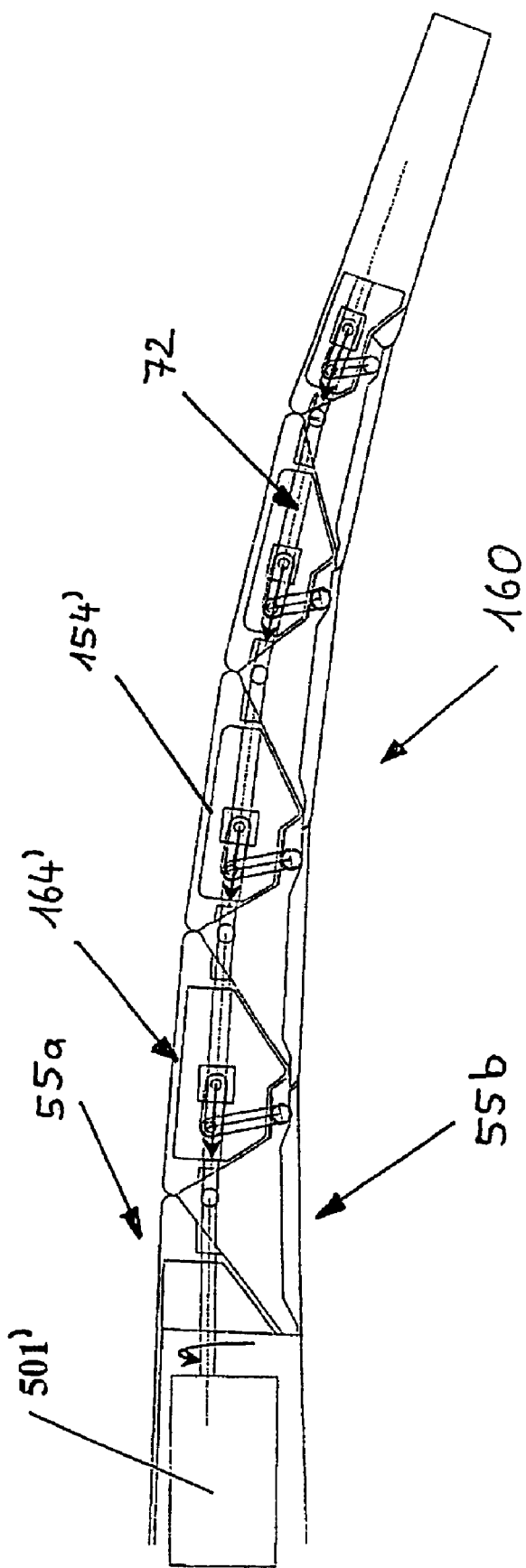
FIG. 12 and FIG. 13 each show a section through the flexible wing area according to the exemplary embodiment shown in FIG. 11 in a position curved down or curved up, respectively.
Figure 13:
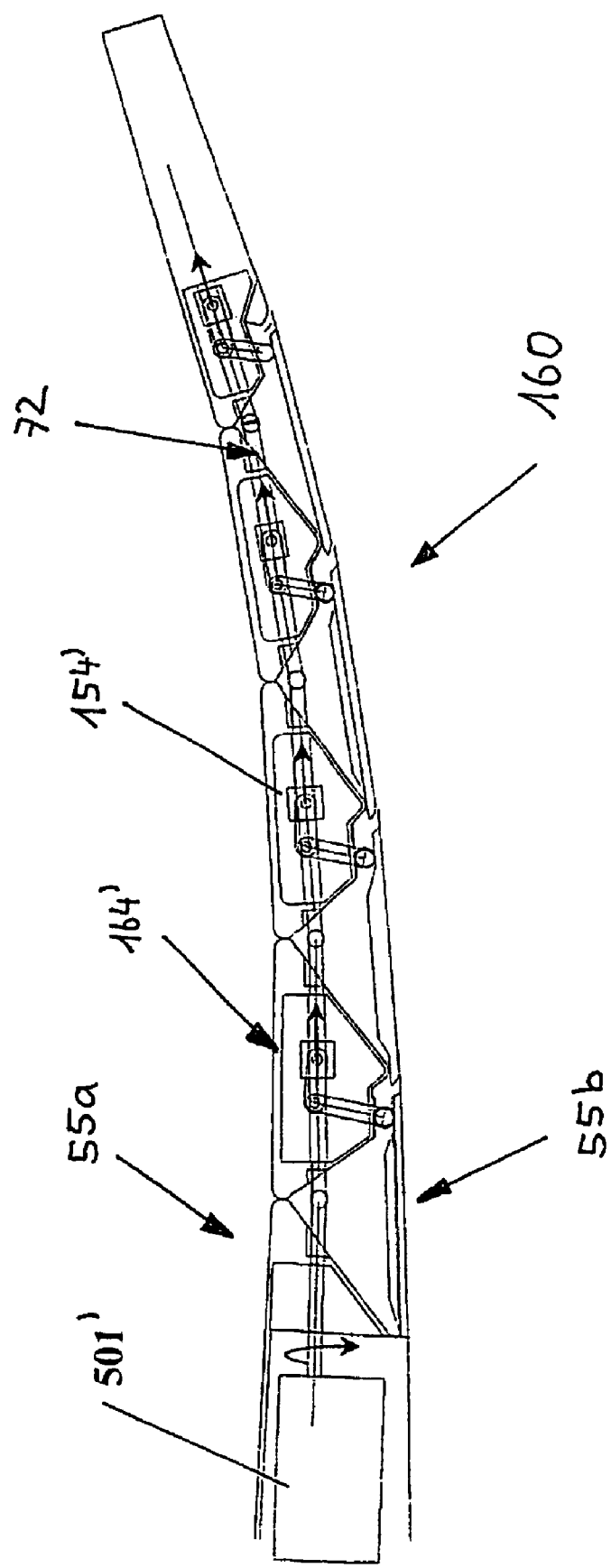

FIGS. 9 and 10 shows spacers 181; 281, which may be provided between the first planking 55a and the second planking 55b and which hold the plankings 55a, 55b at a predefined distance and simultaneously allow relative movement between them upon change of the wing profile. These spacers 181; 281 are each used by a roller-shaped element 182; 282 and a flexible band arrangement 183a, 183b; 283a 283b to guide the roller-shaped element 182; 282 to in order to perform a rolling movement thereof between the plankings 55a and 55b in the event of a relative movement between them. This flexible band arrangement 183a, 183b; 283a; 283b contains at least one flexible band, which is guided around the roller-shaped element 182; 282 and has its ends fixed on the first planking 55a or the second planking 55b, respectively. In the embodiment shown in FIG. 10, the roller-shaped element 282 is divided in the middle and the flexible band 283a, 283b is guided through the middle of the roller-shaped element 282 and in different directions around each half of it while reversing the winding direction.

The rotational position and location of the lever elements 507; 507'; 507" and the rod-shaped drive elements 509; 509'; 509" coupled thereto determine the location of the drive or adjustment areas 163; 163'; 163" of the vortex elements 154; 154'; 154". The location of the second planking 55b in relation to the first planking 55a may be set by connecting the rod-shaped drive elements 509; 509'; 509" to the second planking 55b. The location of the second planking 55b may also be set by connecting it to the drive or adjustment areas 163; 163'; 63" of the vortex elements 154; 154'; 154". The second planking 55b may also be connected to the vortex elements 154; 154'; 154" via lever elements. In particular, the second planking 55b itself may also be formed by the drive elements 509; 509'; 509", which would then be implemented as planar in order to form the surface of the second planking 55b in combination.

In the embodiment of FIGS. 5, 6, and 7, the adjustment mechanism 160 is implemented using lever elements 507 and drive elements 509, wherein the lever element 507 being provided as a roll or roller, which is coupled, using a flexible band 511 attached to its outside, to the particular planking and is coupled on the diametrically opposite side, using a flexible band 512 attached to its outside, to a corresponding rod-shaped drive element 509, compare FIG. 7. The elastic bands 511, 512 are implemented in such a way that they are suitable for transmitting thrust forces. Furthermore, the lever elements 507 are mounted on the drive or adjustment area 163 of the vortex elements 154 so they are rotatable using an axis of rotation 508. Upon rotation of the lever elements 507 using the particular attached drive elements 509, the flexible bands 511, 512 are partially rolled and/or unrolled, so that the position of the particular lever element 507 is displaced along the X direction. The end of the drive element 509 which is diametrically opposite the end mounted using flexible bands is mounted on the axis 508 of the lever element 507. If each drive element 509 connects each two neighboring lever elements 507 in this way, upon actuation of the adjustment mechanism 160, the distances between the roller-shaped lever elements 507 are changed in a predefined way and, simultaneously, the vortex elements 154 are held on the second planking 55b. The vortex elements 154 are connected directly or via the joints 168, 169, 250 to the first planking 55a and, in addition, are mounted via the lever elements 507 on the second planking 55b. In this way, a curvature of the first planking 55a and the second planking 55b, which is predefined as a function of the actuation of the adjustment mechanism 160, is set.

The rod-shaped drive elements 509; 509'; 509", and optionally also the lever elements 507; 507'; 507", may also be designed in such a way that they may be activated individually in order to additionally change the curvature of the plankings 55a, 55b locally, or in other words regions like, or in regions. In the first case, the rod-shaped drive elements 509 are implemented so they may change their lengths themselves.

Pendulum joints 168, compare FIGS. 5 and 6, via which the transmission area 164 of the vortex elements 154 is coupled to the first planking 55a, may be provided for equalizing a relative movement between the first planking 55a and the transmission area 164 of the vortex elements 154. The pendulum joints 168 may also be formed by elastic joint elements, like the joint areas 169 between two neighboring vortex elements 154, particularly by bands 172, 174 having bending elasticity, compare FIG. 8. The joint areas may also be formed by a shared joint between the neighboring vortex elements 154 and the pendulum joints. The shared joint 200 may be formed by bands 172, 174 having bending elasticity, each of which extends in an extension of the leg 154a, 154b of the triangular vortex elements 154, has one side fixed thereon, and intersect one another, and whose other side is fixed on the first planking 55a or passes into this. The first planking 55a located near the transmission area 164 of the vortex elements 154 is connected to the vortex elements 154 by the structure joint 250 in such a way that a pivot or rotation of the vortex elements 154 causes a shape or curvature change of the first planking 55a pressing against them.

Figure 14:
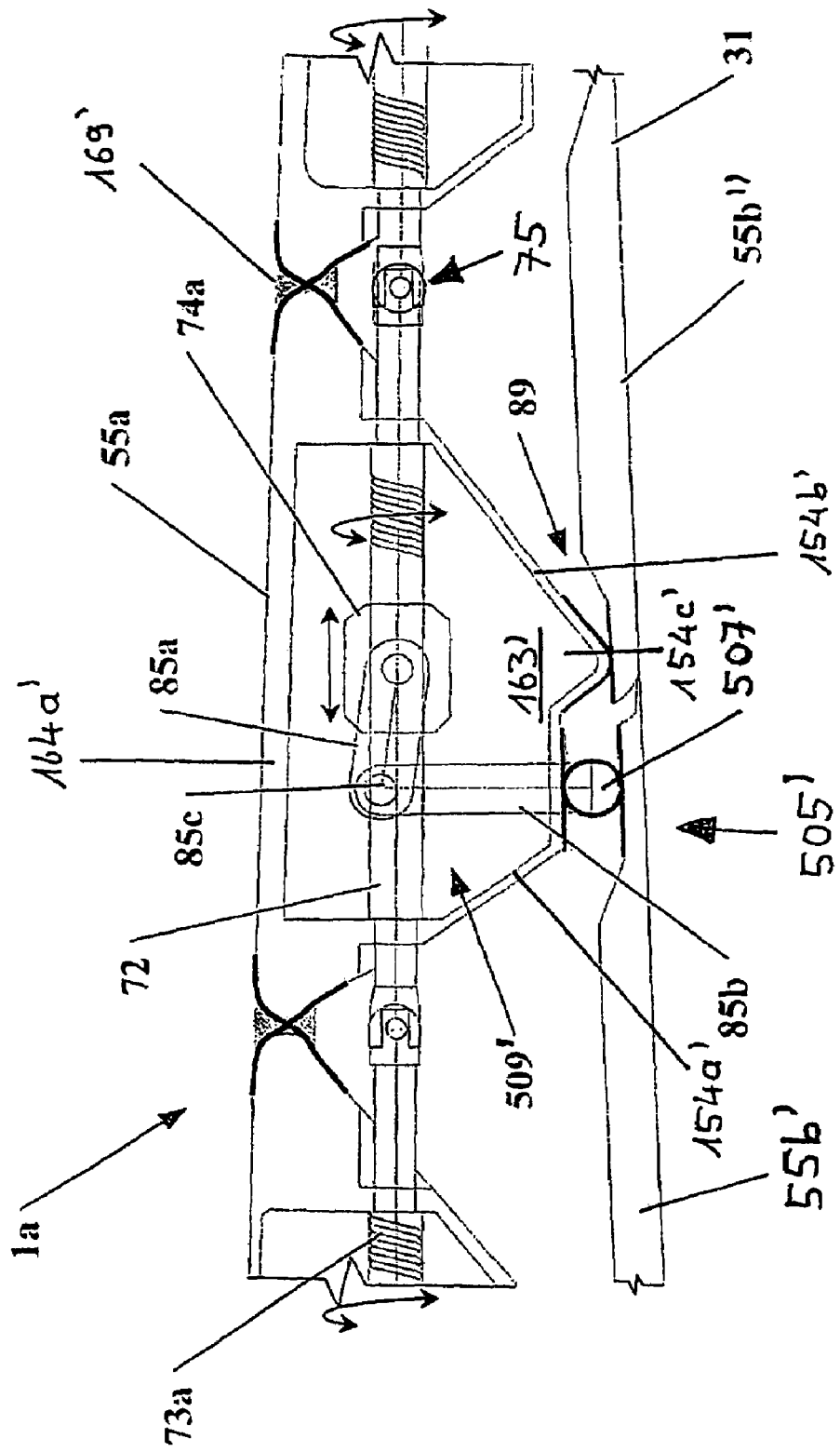
FIG. 14 shows an enlarged detail from FIG. 11 to explain the construction and mode of operation of the flexible wing area in its particulars.

In the exemplary embodiment illustrated in FIGS. 11 through 15, the adjustment mechanism 160' provided for changing the profile shape of the airfoil 1 again comprises a number of box-shaped vortex elements 154', which are longitudinally extended in a direction extending perpendicular to the plane of the drawing and are pressed against one another, or in other words adjacent to each other, on their longitudinal sides and are connected to one another by flexible joint areas 169', compare FIG. 14. The vortex elements 154' have a triangular basic shape having a base element 164a', which simultaneously forms a transmission area 164' and also partially forms the first planking 55a. A first leg 154a' and a second leg 154b' run from the base element 164a' to a tip 154c' diametrically opposite the base element 164a'. The tips 154c' of the vortex elements 154' form drive or adjustment areas 163', to which an adjustment mechanism 160' is coupled, which is used for the purpose of pivoting the vortex elements 154' to change the wing profile in response to a corresponding externally supplied control signal.

The adjustment mechanism 160' provided for adjusting the wing profile is formed by a number of adjustment elements 505', each of which consists of or comprises a lever element 507' and a drive element 509'. The lever elements 507' are formed by roller-shaped elements having a first side of their circumference pressing against a part of the second planking 55b and coupled thereto and having the other side of their circumference pressing against a part of the connection area 163' of the vortex element 154' and coupled thereto. The roller-shaped lever elements 507' are coupled both to the second planking 55b and also to the relevant part of the connection area 163' of the vortex element 154' by a flexible band arrangement 583a' 583b', through which they are guided between the two parts to produce a rolling movement and are simultaneously coupled thereto non-positively, compare FIG. 15.

The drive element 509' comprises a drive lever 85b, which is connected to the lever element 507' so that they rotate together or is implemented in one piece, a pivot thereof causing a rotation or a pivot of the lever element 507' to change the mutual location of the drive or adjustment area 163' of the vortex element 154' and the second planking 55b to change the wing profile. The drive lever 85b is coupled via an intermediate lever 85a to a sliding nut 74a mounted on a rotating spindle 72, the intermediate lever 85a being connected in an articulated way to the drive lever 85b and, in addition, in an articulated way to the sliding nut 74a.

The rotating spindle 72 is positioned so that it runs transversely to the longitudinal direction of the lever elements 154' and is coupled to a rotating actuator 501' for driving it and therefore for driving of the adjustment mechanism 160'. Cardan-joint coupling elements 75' are located between individual parts of the rotating spindle 72, so that the location of the rotating spindle 72 may be adapted to the curvature of the wing profile. Upon rotation of the rotating spindle 72 by the rotating actuator 501', the lever elements 507' rotate or pivot via the drive lever 85b forming the drive element 509' and intermediate lever 85a, through which the profile shape may be brought from the extended position shown in FIG. 11 into the downward curved position shown in FIG. 12 or into the upward curved position shown in FIG. 13.

As is shown in FIG. 14 in particular, the second planking 55b is divided at two neighboring vortex elements 154' into individual planking segments 55b', 55b", which are displaceable toward one another upon change of the shape of the wing profile to equalize the length between the first planking 55a and the second planking 55b.

Figure 15:
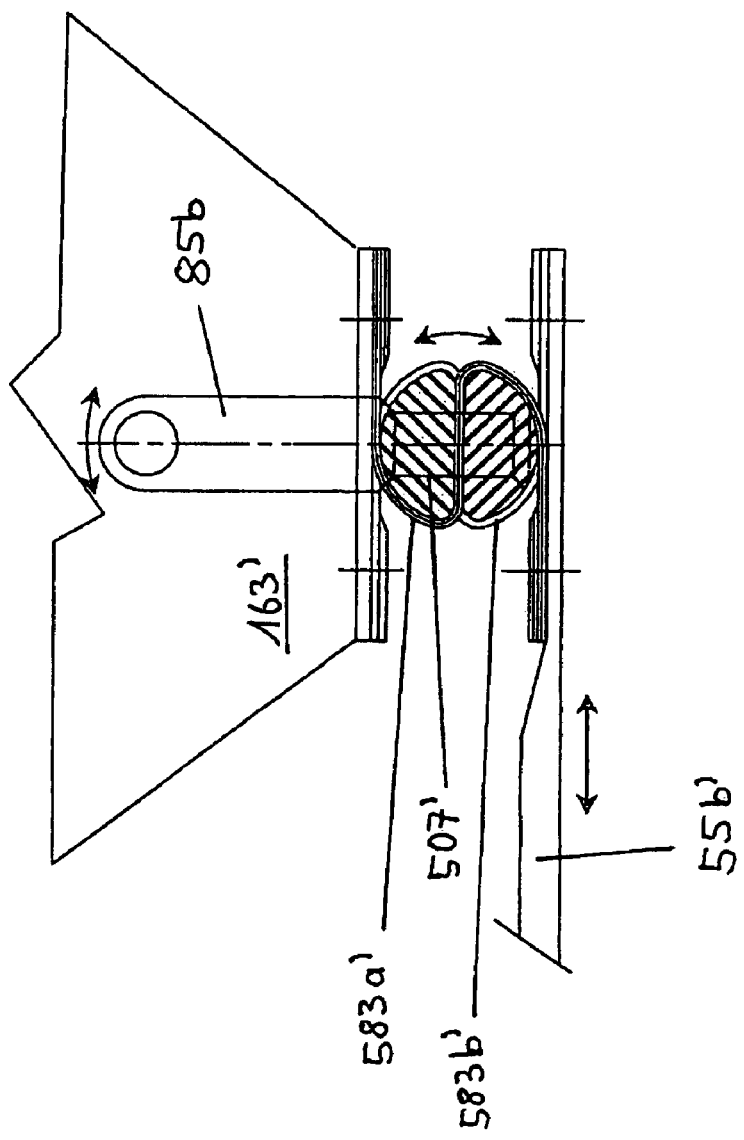
FIG. 15 shows a further enlarged detail from FIG. 14 to explain a preferred type of connection between vortex elements contained in the flexible wing area and the planking of the wing.
Figure 16:
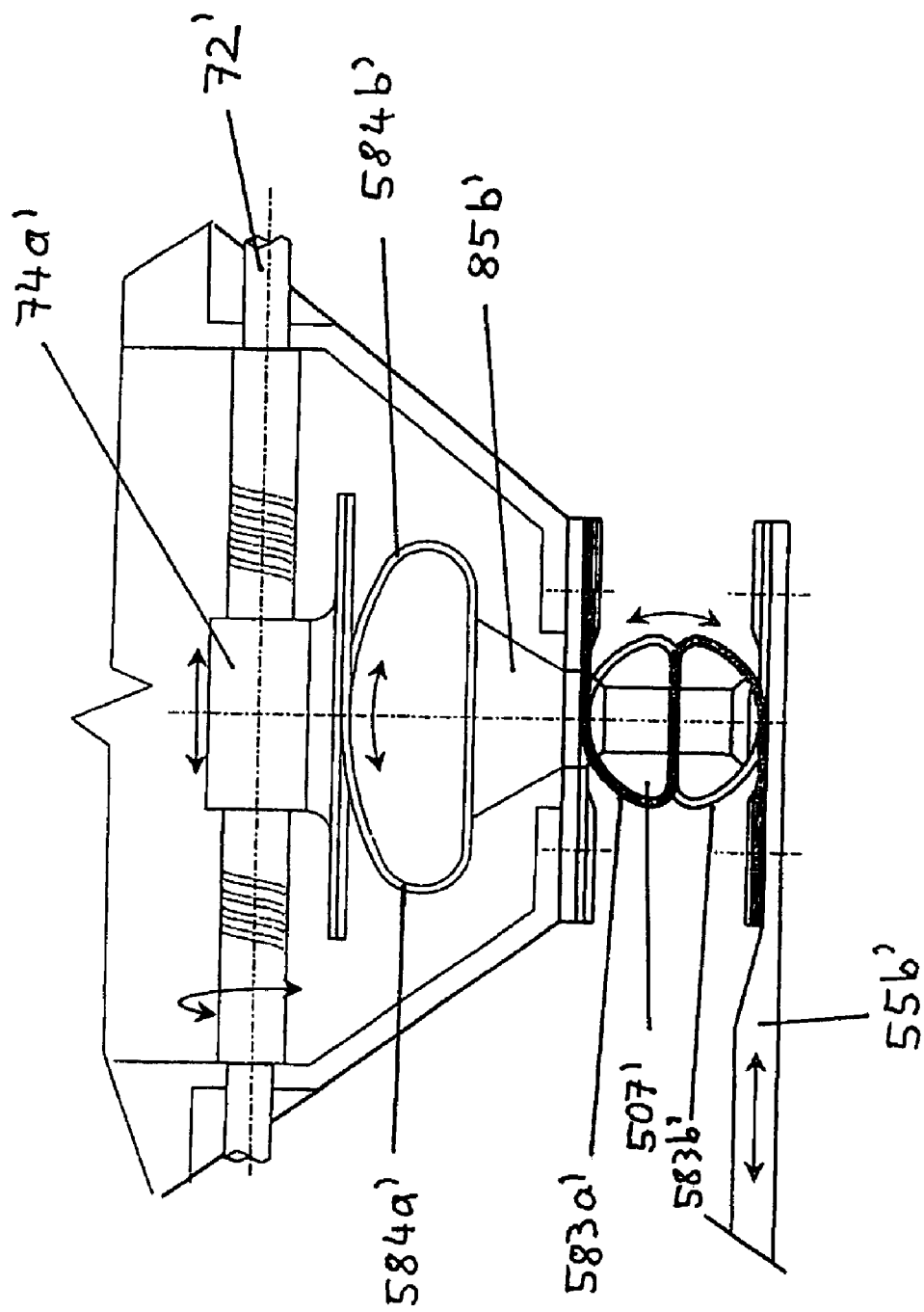
FIG. 16 shows another embodiment of the adjustment mechanism used for adjusting the flexible wing area.

As an alternative to the embodiment shown in FIG. 15 in detail, the drive element 509' may also have a flexible band arrangement 584a', 584b', which is provided between a drive lever 85b, which is coupled to the lever element 507' so that they rotate together, and a sliding nut 74a' mounted on the rotating spindle 72'. In this case, the flexible band arrangement 584a', 584b' is implemented so that the sliding nut 74a' is displaceable along the rotating spindle 72' on a radius around the center point of the roller-shaped lever element 507'.

According to the further exemplary embodiment, which is shown in FIGS. 17a) and b) and is implemented on the basis of the wing front edge region, which has a variable profile, compare FIGS. 1 through 3, multiple box-shaped vortex elements 154" positioned one after another are again provided, as in the exemplary embodiment of FIGS. 11 through 15, each of their drive levers 85b being connected to a pushrod 76, however, which may be displaced by a thrust actuator 501" between a retracted position, see FIG. 17a), and an extended position, see FIG. 17b). For this purpose, the individual pushrods 76 are each coupled to one another and/or to the thrust actuator 501" via a singly articulated coupling element 75".

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

LIST OF REFERENCE NUMBERS 1 wing
3 wing box
5 wing depth direction
10 wingspan direction
11 front edge area, flexible area 12 rear edge area, flexible area
14 wing tip area
15 flexible area
16 profile section
55a first planking
55b second planking
72; 72' rotating spindle
74a; 74a' sliding nut
75 coupling element
76 pushrod
85a intermediate lever
85b; 85b' drive lever
154; 154'; 154" vortex elements
154a . . . first leg
154b . . . second leg
154c . . . tip
154g . . . joint
160; 160'; 160" adjustment mechanism
163; 163'; 163" drive or adjustment area
164; 164'; 164" transmission area
164a . . . base element
168 pendulum joint
169; 169'; 169" joint area
170 joint area
172 band having bending elasticity
174 band having bending elasticity
176 filler part
177 web or spar element
178 articulated connection
179 articulated connection
181 spacer
182 roller-shaped element
183a flexible band arrangement
184b flexible band arrangement
210 rotating joint
230 pendulum joint
250 structure joint
281 spacer
282 roller-shaped element
283a flexible band arrangement
283b flexible band arrangement
501; 501'; 501" actuator
501a final control element
505; 505'; 505" adjustment element
507; 507'; 507" lever element
508 axis of rotation
509; 509'; 509" drive element
511 flexible band arrangement
512 flexible band arrangement
583a; 583a' flexible band arrangement
583b; 583b' flexible band arrangement
584a'; 584b' flexible band arrangement

What is claimed is:

1. A wing having a changeable profile and extending in an airflow direction and in a direction substantially transverse to the airflow direction, the wing comprising:
   a first planking;
   a second planking; and
   an adjustment mechanism; comprising:
      a drive element,
      a lever element, and
      a vortex element having a drive or adjustment area, wherein the lever element is coupled, rotatably or pivotably, between the second planking on a first side of the lever element and the drive or adjustment area of the vortex element at an axis of rotation of the lever element, the axis of rotation of the lever element being disposed either at a second side of the lever element or between the first side and the second side of the lever element, and the vortex element extending in a longitudinal direction and having a longitudinal side articulatedly coupled to the wing at a joint area between the first planking and the second planking,
      the vortex element having a transmission area extending transversely to the longitudinal direction and being coupled to the first planking, and the drive or adjustment area is disposed at a distance in a vertical direction, wherein the adjustment mechanism is coupled to the wing such that the drive element is capable of mutually displacing the drive or adjustment area and the second planking by rotating or pivoting the lever element, changing the profile of the wing, in response to an externally supplied control signal.

2. The wing of claim 1, wherein the adjustment mechanism includes a plurality of the lever elements and a plurality of the vortex elements, each of the plurality of the vortex elements being disposed one behind the other, and each of the plurality of lever elements is coupled on the first side to the second planking and on the second side or on an axis of rotation of each of the plurality of the lever elements to the drive or adjustment area of a respective one of the plurality of the vortex elements, wherein a rotation or pivot of one of the plurality of the lever elements by the drive element causes mutual displacement of the drive or adjustment area and the second planking.

3. The wing of claim 1, wherein the lever element is coupled to the drive element and the axis of rotation of the lever element is mounted on the drive or adjustment area of the vortex element such that the vortex element is rotatable.

4. The wing of claim 1, wherein the drive element is formed by a drive cable, whose length, location or both thereof are changeable, wherein changing of the length, the location or both thereof, causes a rotation or pivot of the lever element changing the profile of the wing in response to the externally supplied control signal.

5. The wing of claim 4, wherein the vortex element is one of a plurality of vortex elements, each of the plurality of vortex elements being disposed one behind the other.

6. The wing of claim 5, wherein the adjustment mechanism includes a plurality of drive elements, and one of the drive elements, is disposed between an adjacent pair of two adjacent vortex elements and is coupled between the drive or adjustment area of one of the two adjacent vortex elements and the second side of the lever element of the other one of the two adjacent vortex elements.

7. The wing of claim 6, wherein a first one of the plurality of vortex elements in the drive direction is coupled to an actuator device, which is connected to the lever elements of the first vortex elements or directly to the drive or adjustment area of the first one of the plurality of vortex elements.

8. The wing of claim 5, wherein the adjustment mechanism includes a plurality of drive elements, and one of the plurality of drive elements is disposed between two adjacent vortex elements of the plurality of vortex elements and comprises an actuator device having a length changeable in response to the externally supplied control signal.

9. The wing of claim 5, wherein the second planking is divided at two adjacent vortex elements into individual planking segments, the individual planking segments being displaceable toward one another upon change of the shape of the wing profile to equalize length between the first planking and the second planking.

10. The wing of claim 9, wherein the individual planking segments include a first planking segment and a second planking segment, adjacent to the first planking segment, and the first planking segment is coupled to the first side of the lever element, and the second planking segment is coupled to the drive or adjustment area of the vortex element coupled to the lever element, whereby rotation or pivot of the lever element causes a change of the shape of the wing profile and a change of the mutual location of the neighboring planking segments.

11. The wing of claim 1, wherein the lever element is formed by a roller-shaped element, and one side of a circumference of the roller-shaped element presses against a portion of the second planking and an opposite side of the circumference of the roller-shaped element presses against a portion of the drive or adjustment area of the vortex element or is coupled to the drive element.

12. The wing of claim 11, wherein the roller-shaped element is guided by a flexible band arrangement to produce a rolling movement between the portion of the second planking and either the portion of the drive or adjustment area of the vortex element or the drive element.

13. The wing of claim 1, wherein the second planking is implemented as undivided at two neighboring vortex elements, and a device for length equalization between the first planking and the second planking is provided.

14. The wing of claim 1, wherein the vortex elements has a substantially triangular basic shape in cross-section, wherein the transmission area is formed by the base of the substantially triangular basic shape and the drive or adjustment area is formed by an opposite tip of the substantially triangular basic shape.

15. The wing of claim 1, wherein a pendulum joint is provided for equalizing a relative movement between the first planking and the vortex element, and the transmission area of the vortex element is coupled to the first planking using the pendulum joint.

16. The wing of claim 15, wherein the joint area or pendulum joint or both thereof are formed by elastic joints.

17. The wing of claim 16, wherein the joint area or the pendulum joint or both thereof are formed by bands having bending elasticity.

18. The wing of claim 1, wherein the joint area and a pendulum joint are formed by a shared joint.

19. The wing of claim 18, wherein the adjustment mechanism includes a plurality of vortex elements and each of the plurality of vortex elements is triangular, has three sides, and the shared joint is formed by bands having bending elasticity, wherein each of the bands extends in an extension of one of the three sides of the each of the plurality of vortex elements, has one side fixed thereon, and intersect one another, and another side is fixed on the first planking of the wing or passes into the first planking.

20. The wing of claim 1, wherein a spacer is provided between the first planking and the second planking, through which the first planking and the second planking are held at a predefined distance and a relative movement between the two plankings is simultaneously made upon change of the wing profile.

21. The wing of claim 20, wherein the spacer contains a roller-shaped element and a flexible band arrangement for guiding the roller-shaped element to perform a rolling movement of the roller-shaped element between the first planking and the second planking upon a relative movement between the first planking and the second planking.

22. The wing of claim 21, wherein the flexible band arrangement includes at least one flexible band guided around the roller-shaped element and the ends of the flexible band arrangements are fixed on the first planking, the second planking or both the first planking and the second planking.

23. The wing of claim 22, wherein the roller-shaped element is divided in the middle, and the flexible band is guided through the middle of the roller-shaped element and in different directions around each half of the roller-shaped element while reversing the direction of winding.

24. The wing of claim 1, wherein the drive element includes a drive lever pivotably connected to the lever element, such that when the drive lever pivotably rotates in response to the externally supplied control signal, then the lever element pivotably rotates, changing the profile of the wing.

25. The wing of claim 24, wherein the drive lever of the drive element is coupled to a rotating spindle or to a pushrod, and the rotating spindle or the pushrod pivotably rotates the driver lever in response to the externally supplied control signal.

26. The wing of claim 25, wherein the rotating spindle or the pushrod is disposed transversly to the longitudinal direction of the vortex element.

27. The wing of claim 26, wherein the rotating spindle is coupled to a rotating actuator, the rotating actuator rotating in response to the externally supplied control signal.

28. The wing of claim 27, wherein the rotating spindle is one of a plurality of rotating spindles, the drive lever is one of a plurality of drive levers, the lever element is one of a plurality of lever elements, and the vortex is one a plurality of vortex elements disposed one behind the other, and each of the vortex elements are coupled to the respective lever elements, the respective lever elements are pivotably connected to respective drive levers, the respective drive levers are coupled to respective rotating spindles, and each of the respective rotating spindles is couples to the rotating actuator, such that rotation of the rotating actuator in response to the externally supplied control signal rotates each of the respective lever elements, changing the profile of the wing.

29. The wing of claim 25, further comprising an intermediate lever articulatedly coupled between the drive lever and a sliding nut mounted on the rotating spindle, such that rotating the rotating spindle displaces the sliding nut along the rotating spindle, rotating the drive lever.

30. The wing of claim 25, further comprising an intermediate flexible band flexibly coupled between the drive lever and a sliding nut mounted on the rotating spindle, such that rotating the rotating spindle displaces the sliding nut along the rotating spindle, rotating the drive lever.

* * * * *